United States Patent
Xu et al.

(10) Patent No.: US 12,356,492 B2
(45) Date of Patent: Jul. 8, 2025

(54) METHODS AND APPARATUS FOR INACTIVE STATE INITIAL UPLINK TRANSMISSION USING PRE-CONFIGURED GRANT AT A USER EQUIPMENT IN WIRELESS COMMUNICATION

(71) Applicant: Apple Inc., Cupertino, CA (US)

(72) Inventors: Fangli Xu, Cupertino, CA (US); Chunhai Yao, Cupertino, CA (US); Haijing A. Hu, Cupertino, CA (US); Murtazak A. Shikari, Cupertino, CA (US); Sarma V. Vangala, Cupertino, CA (US); Srinivasan Nimmala, Cupertino, CA (US); Dawei Zheng, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,241

(22) PCT Filed: Sep. 28, 2020

(86) PCT No.: PCT/CN2020/118211
§ 371 (c)(1),
(2) Date: Oct. 14, 2021

(87) PCT Pub. No.: WO2022/061844
PCT Pub. Date: Mar. 31, 2022

(65) Prior Publication Data
US 2023/0217529 A1    Jul. 6, 2023

(51) Int. Cl.
*H04W 76/27* (2018.01)
*H04W 56/00* (2009.01)
(Continued)

(52) U.S. Cl.
CPC ....... *H04W 76/27* (2018.02); *H04W 56/0045* (2013.01); *H04W 72/12* (2013.01); *H04W 74/0833* (2013.01)

(58) Field of Classification Search
CPC . H04W 76/27; H04W 56/0045; H04W 72/12; H04W 74/0833
See application file for complete search history.

(56) References Cited

U.S. PATENT DOCUMENTS

| 2020/0229265 A1 | 7/2020 | Wang et al. | |
| 2022/0086899 A1* | 3/2022 | Shih | H04W 74/0833 |

(Continued)

FOREIGN PATENT DOCUMENTS

| CN | 110971360 A | 4/2020 |
| CN | 111328151 A | 6/2020 |

(Continued)

OTHER PUBLICATIONS

R2-2007489 Nokia "Small Data Transmission over pre-configured PUSCH resources" 3GPP WG2 #111e Aug. 17-28, 2020.*
(Continued)

*Primary Examiner* — Basil Ma
(74) *Attorney, Agent, or Firm* — Kubota & Basol LLP

(57) ABSTRACT

A user equipment (UE) device including an antenna, a memory, an RF circuitry commutatively coupled to the antenna, and a processor configured to perform operations is described. In an exemplary embodiment, the operations include receiving the one or more pre-configured grant (pre-CG) configurations for an RRC_INACTIVE state from a network node. The one or more pre-CG configurations are for an initial data transmission when the UE is in the RRC_INACTIVE state. The operations also include performing, while the UE is in the RRC_INACTIVE state, the initial data transmission using a pre-CG resource based on (Continued)

Option 1a: dedicated configuration the received one or more pre-CG configurations. Each of the one or more pre-CG configurations includes a configuration of the pre-CG resource and one or more conditions to use the pre-CG resource. The one or more conditions to use the pre-CG resource include one or more of an access type, a transmission priority, a mapped Logical Channel (LCH)/Dedicated Radio Bearer (DRB)/Quality of Service (QoS) flow, and a valid timing advance (TA).

21 Claims, 17 Drawing Sheets

(51) Int. Cl.
*H04W 72/12* (2023.01)
*H04W 74/0833* (2024.01)

(56) References Cited

U.S. PATENT DOCUMENTS

2022/0330317 A1\* 10/2022 Lee ................ H04W 76/27
2023/0123151 A1   4/2023 Yun

FOREIGN PATENT DOCUMENTS

WO   2020/067757 A1   4/2020
WO   2020/067790 A1   4/2020

OTHER PUBLICATIONS

International Preliminary Report on Patentability received for PCT Patent Application No. PCT/CN2020/118211, mailed on Apr. 6, 2023, 5 pages.
International Search Report and Written Opinion received for PCT Patent Application No. PCT/CN2020/118211, mailed on Jul. 1, 2021, 6 pages.
Nokia, "Small Data Transmission over pre-configured PUSCH resources", 3GPP TSG-RAN WG2 Meeting #111e, R2-2007489, Release 17, Aug. 17-28, 2020, 5 pages.
Supplementary European Search Report and Search Opinion received for European Application No. 20954695.1, mailed on Feb. 26, 2024, 11 pages.
ZTE Corporation, "Summary of small data enhancements for NR Rel-17—Phase 2", 3GPP TSG-RAN Meeting #86 RP-192574, Dec. 8-12, 2019, 37 pages.
Search Report received for Chinese Patent Application No. 202080105459.1, mailed on Jan. 26, 2025, 5 Pages (2 Pages of English Translation and 3 Pages of Official Copy).

\* cited by examiner

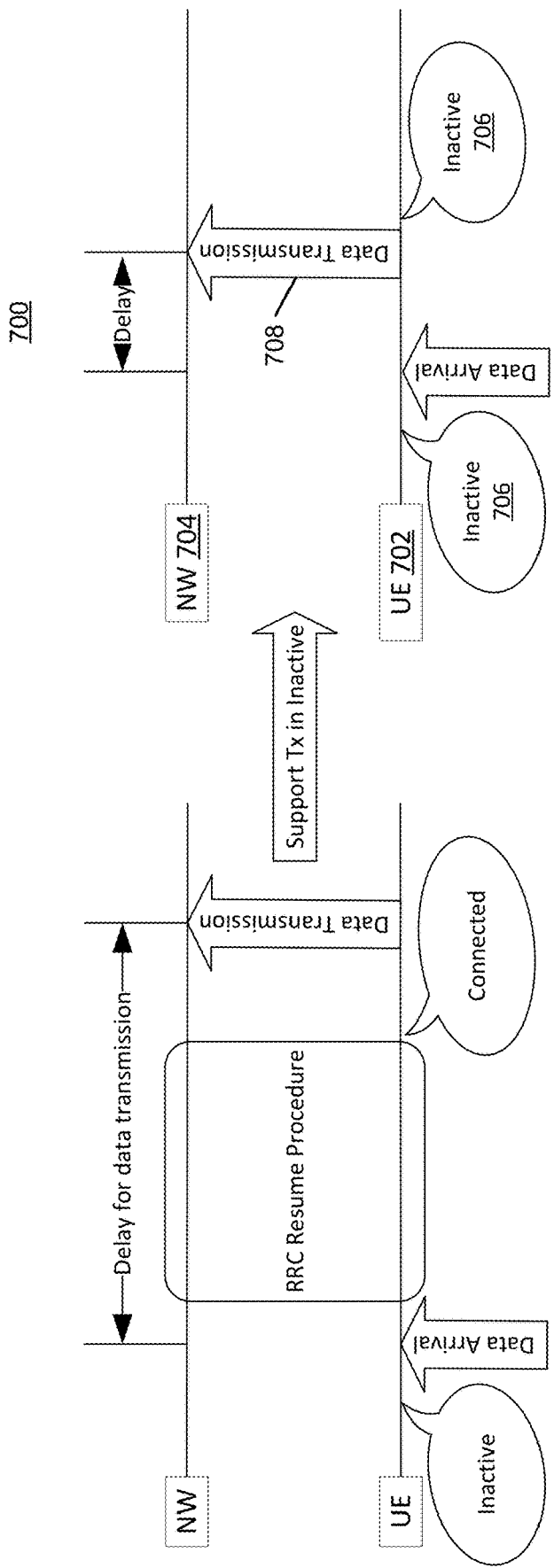

METHODS AND APPARATUS FOR INACTIVE STATE INITIAL UPLINK TRANSMISSION USING PRE-CONFIGURED GRANT AT A USER EQUIPMENT IN WIRELESS COMMUNICATION

RELATED APPLICATIONS

The present application is the national phase of International Application No. PCT/CN2020/118211, filed on Sep. 28, 2020 and the disclosure of which is hereby incorporated herein by reference in its entirety.

FIELD OF INVENTION

This invention relates generally to wireless technology and more particularly to methods and apparatus for data transmission using pre-configured grant for a user equipment (UE) in inactive state.

BACKGROUND OF THE INVENTION

In a wireless communications network, 5G New radio (NR) provides a faster network with higher capacity that can facilitate control of Internet of Things (IoT) such as remote devices in applications where real-time network performance is critical. With an increasing demand for a faster data exchange and seamless communication, lowering latency and battery consumption has been pivotal in supporting such demand maintaining the performance of the 5G NR technology.

5G NR supports three RRC states including RRC CONNECTED, RRC INACTIVE, and RRC IDLE. UEs with small and infrequent data transmission are generally maintained by the network in the RRC_INACTIVE state. Smartphone applications such as traffic from instant messaging services and push notifications from mobile applications are some examples of small and infrequent data traffic.

5G NR protocol stacks, including a control plane and a user plane, provides connectivity between the UE and the gNB or the core network (CN). In terms of control plane for the INACTIVE state, the UE has non-access stratum (NAS) connection to the CN. Additionally, the UE has no dedicated access stratum (AS) resource the UE maintains the RRC configuration before the UE entering INACTIVE state. In terms of user plane for the INACTIVE state, the UE cannot perform any dedicated data transmission/reception. If UE has dedicated data transmission/reception, the UE should enter CONNECTED state. Specifically, For DL data transmission, gNodeB pages the UE via RAN-paging mechanism to trigger UE to enter CONNECTED state. For uplink (UL) data transmission, the UE will trigger RACH procedure to enter the CONNECTED state. In terms of mobility for the INACTIVE state, the UE in the INACTIVE state can move within an RNA (i.e. RAN notification area) without notifying NG-RAN. Cell selection/re-selection procedure is the same as in RRC_IDLE state.

There are three common state transition scenarios between the INACTIVE and CONNECTED states. First, state transition from the CONNECTED state to the INACTIVE state includes RRC Release with suspend information. State transition from the INACTIVE state to the CONNECTED state includes RRC Resume procedure. State transition from the INACTIVE to the IDLE states includes (1) RRC Release and (2) abnormal case (cannot find cell for camping).

In a legacy network, a configured grant transmission is only used for the data transmission while the UE is in CONNECTED state. In addition, in the legacy network, configured grant resource is UE specific and does not support contention resolution for shared resource case. Further, in the legacy network, the initial access procedure between the UE and the network (gNB) is only via a RACH procedure when the UE in INACTIVE state triggers the initial transmission for the RRC Resume procedure.

Thus, there is a need for an enhanced mechanism for the pre-configured uplink (UL) grant that can be used for the initial transmission at the UE in INACTIVE state UE, thereby reducing the data transmission latency and the amount of signaling overhead that occurs during state transitions. Accordingly, this enhanced mechanism can support small data transmission of the UE in INACTIVE state without transitioning to RRC CONNECTED state.

SUMMARY OF THE DESCRIPTION

Methods and apparatuses from a user equipment (UE) and a base band (BB) processor perspective are described. The described embodiments relate to methods and apparatuses for enabling the apparatuses to perform an initial data transmission using a pre-CG resource based on a received one or more pre-CG configurations.

In an exemplary embodiment, the UE having a processor configured to perform operations including receiving the one or more pre-configured grant (pre-CG) configurations for an RRC_INACTIVE state from a network node. The term network node can also refer to a base station and often these two terms are used interchangeably. The one or more pre-CG configurations are for an initial data transmission when the UE is in the RRC_INACTIVE state. The operations also include performing, while the UE is in the RRC_INACTIVE state, the initial data transmission using a pre-CG resource based on the received one or more pre-CG configurations.

In some embodiments, each of the one or more pre-CG configurations includes a configuration of the pre-CG resource and one or more conditions to use the pre-CG resource. In these embodiments, the one or more conditions to use the pre-CG resource include one or more of an access type, a transmission priority, a mapped Logical Channel (LCH)/Dedicated Radio Bearer (DRB)/Quality of Service (QoS) flow, and a valid timing advance (TA).

In some embodiments, the operations receiving the one or more pre-CG configurations include receiving a dedicated RRC message including the one or more pre-CG configurations for the RRC_INACTIVE state. The operations include entering the RRC_INACTIVE state. The operations also include receiving a broadcast message including an indication if a cell sending the broadcast message supports the initial data transmission using the pre-CG resource. The operations include triggering the initial data transmission using the pre-CG resource to the cell based on the received one or more pre-CG configurations based on the indication in the broadcast message.

In some embodiments, the operations receiving the one or more pre-CG configurations include receiving a dedicated RRC message including the one or more pre-CG configurations for the RRC_INACTIVE state and a list of cells for which the one or more pre-CG configurations are valid. The UE enters the RRC_INACTIVE state. The operations also include determining whether a current camping cell is included in the list of cells for which the one or more pre-CG configurations are valid. The operations include triggering the initial data transmission using the pre-CG resource to the current camping cell based on the determination.

In some embodiments, the operations receiving the one or more pre-CG configurations include entering the RRC_INACTIVE state. The operations also include receiving a System Information Block (SIB) including the one or more pre-CG configurations for the RRC_INACTIVE state from a current camping cell. The operations include triggering the initial data transmission using the configured grant (CG) resource.

In some other embodiments, the operations include determining whether the UE has data to be transmitted when the UE is in the RRC_INACTIVE state. The operations include determining whether the one or more pre-CG configurations are configured and the one or more conditions to use the pre-CG resource are fulfilled. If the one or more conditions to use the pre-CG resource are fulfilled, the operations include performing the initial data transmission using the received one or more pre-CG configurations. If the one or more conditions to use the pre-CG resource are not fulfilled, the operations include determining whether the UE is allowed to perform the initial data transmission via a Random Access Channel (RACH) procedure in a current camping cell. If the UE is allowed to perform the initial data transmission via the RACH procedure, the operations include performing the initial data transmission via the RACH procedure. If the UE is not allowed to perform the initial data transmission via the RACH procedure, the operations include performing the first transmission via a RRC connection Resume Procedure.

In some embodiments, the operations include a UE identifier (ID) in a MAC Protocol Data Units (PDU) for the initial data transmission. The operations also include monitoring a network feedback within a predefined time window after the initial data transmission using the pre-CG resource. The UE determines whether the initial data transmission is successful.

In some embodiments, the UE ID is an Inactive RNTI (I-RNTI).

In some embodiments, the determination of the successful initial data transmission is based on receiving the network feedback including an Inactive RNTI (I-RNTI) of the UE.

In some embodiments, a CG configuration of the one or more pre-CG configurations includes a CG-RNTI, and determination of the successful initial data transmission is based on receiving the network feedback including a downlink MAC PDU including the UE ID, which is scheduled using the CG-RNTI of the CG configuration used for the initial data transmission.

In some embodiments, the operations include determining the initial data transmission is unsuccessful when the UE does not receive the network feedback within the predefined time window.

In some embodiments, the operations include monitoring a network feedback within a predefined time window after the initial data transmission using the pre-CG resource. The operations include determining the initial data transmission is successful when the UE receives the network feedback including a layer 1 acknowledgement (ACK) feedback, or a downlink control information (DCI) for uplink (UL) grant or downlink (DL) assignment with a corresponding CG-RNTI for the UE, or a I-RNTI for the UE.

In some embodiments, the operations include determining whether the UE has a valid TA to trigger the initial data transmission using the pre-CG resource. The determination includes operations determining that the UE has the valid TA when the UE mobility is limited since the UE enters the RRC_INACTIVE mode. The valid TA is a TA used in a previous RRC_CONNECTED state. The operations also include determining that the UE has the valid TA when the current camping cell indicates the pre-CG resource is allowed, wherein a value of the valid TA equals to zero.

In another further aspect of the disclosure, embodiments of the present disclosure also provide a baseband processor configured to perform the processes as described above.

In another aspect of the disclosure, embodiments of the present disclosure also provide a method to perform the processes as described above.

BRIEF DESCRIPTION OF THE DRAWINGS

The present invention is illustrated by way of example and not limitation in the figures of the accompanying drawings in which like references indicate similar elements.

FIG. 7A is an illustration of some embodiments of a legacy procedure, according to some embodiments.

FIG. 7B is an illustration of some embodiments of a small data transmission while the UE is in RRC_INACTIVE state, according to some embodiments.

DETAILED DESCRIPTION

Figure 1:
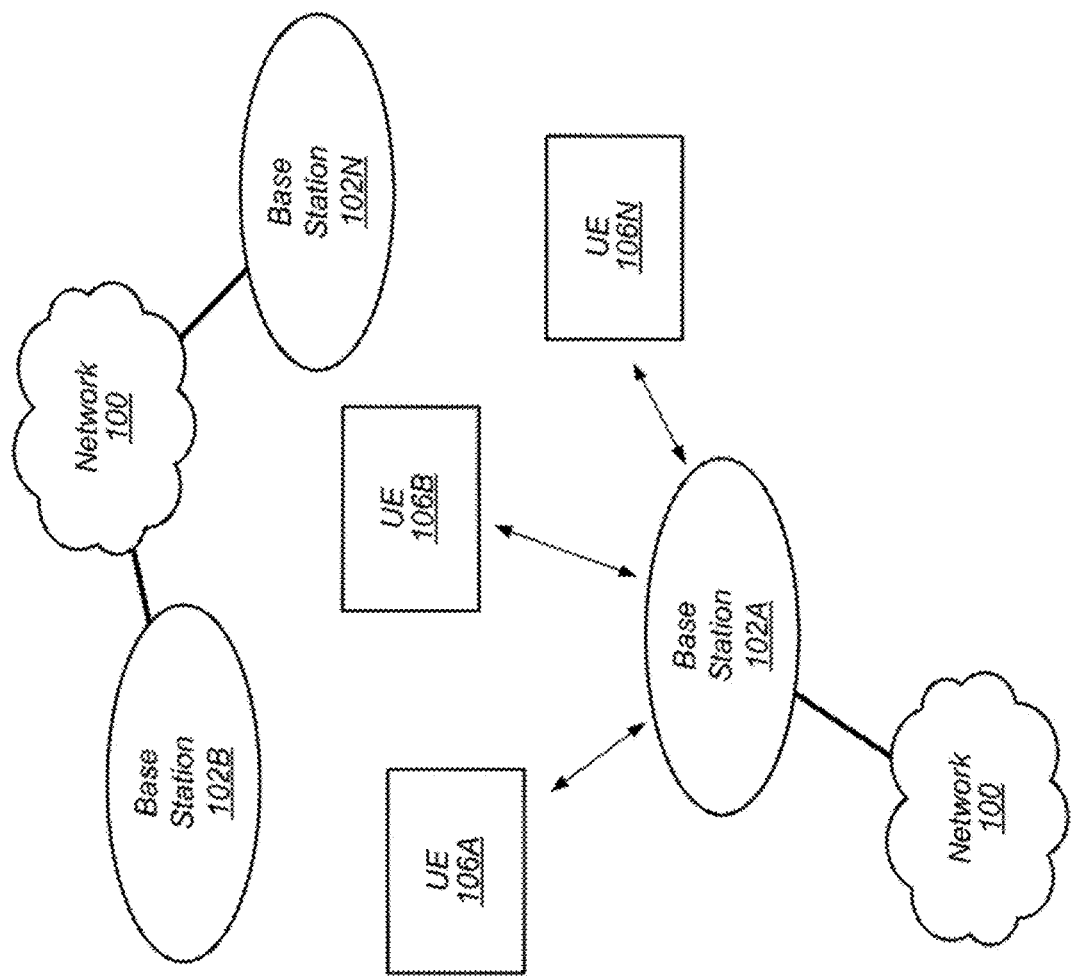
FIG. 1 illustrates an example wireless communication system according to some embodiments.

Methods and apparatuses that enable an apparatus of a device to perform an initial data transmission using one or more pre-configured grant (pre-CG) configurations while the apparatus of the device is in the RRC_INACTIVE state is described. The one or more pre-CG configurations refers to pre-configured physical uplink shared channel (PUSCH)

resources configurations. The embodiments of methods and apparatuses receive the one or more pre-CG configurations for an RRC_INACTIVE state from a network node, wherein the one or more pre-CG configurations are for an initial data transmission when the apparatus of device is in the RRC_INACTIVE state. Thereafter, the methods and apparatuses perform, while the apparatus of device is in the RRC_INACTIVE state. The initial data transmission uses a pre-CG resource based on the received one or more pre-CG configurations. Accordingly, the embodiments of the methods and apparatuses can support a small data transmission of an apparatus of device in an RRC_INACTIVE state without a state transition to a RRC_CONNECTED state.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
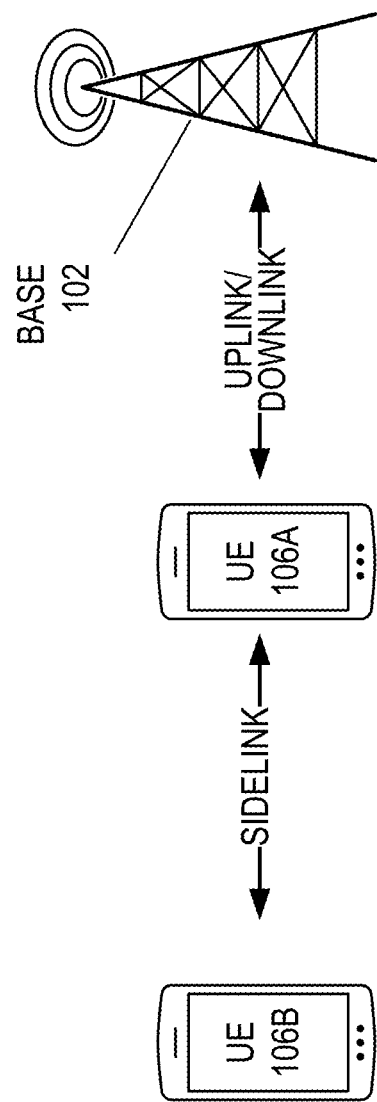
FIG. 2 illustrates a base station (BS) in communication with a user equipment (UE) device according to some embodiments.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, physical sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V2I), vehicle to people (V2P), vehicle to network (V2N), and other types of direct communications.

UE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1xRTTor LTE or GSM), and separate radios for communicating using each of Wi-Fi and Bluetooth. Other configurations are also possible.

Figure 3:
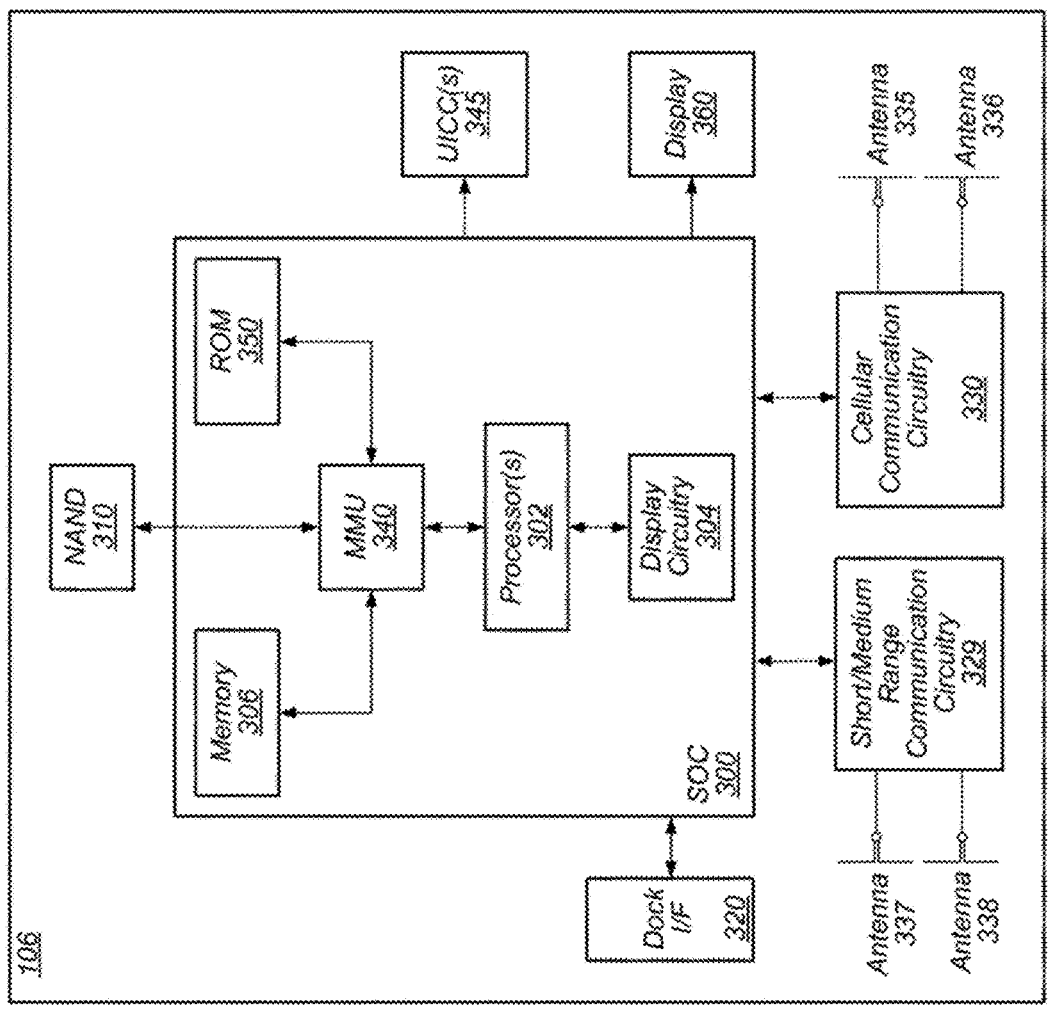
FIG. 3 illustrates an example block diagram of a UE according to some embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
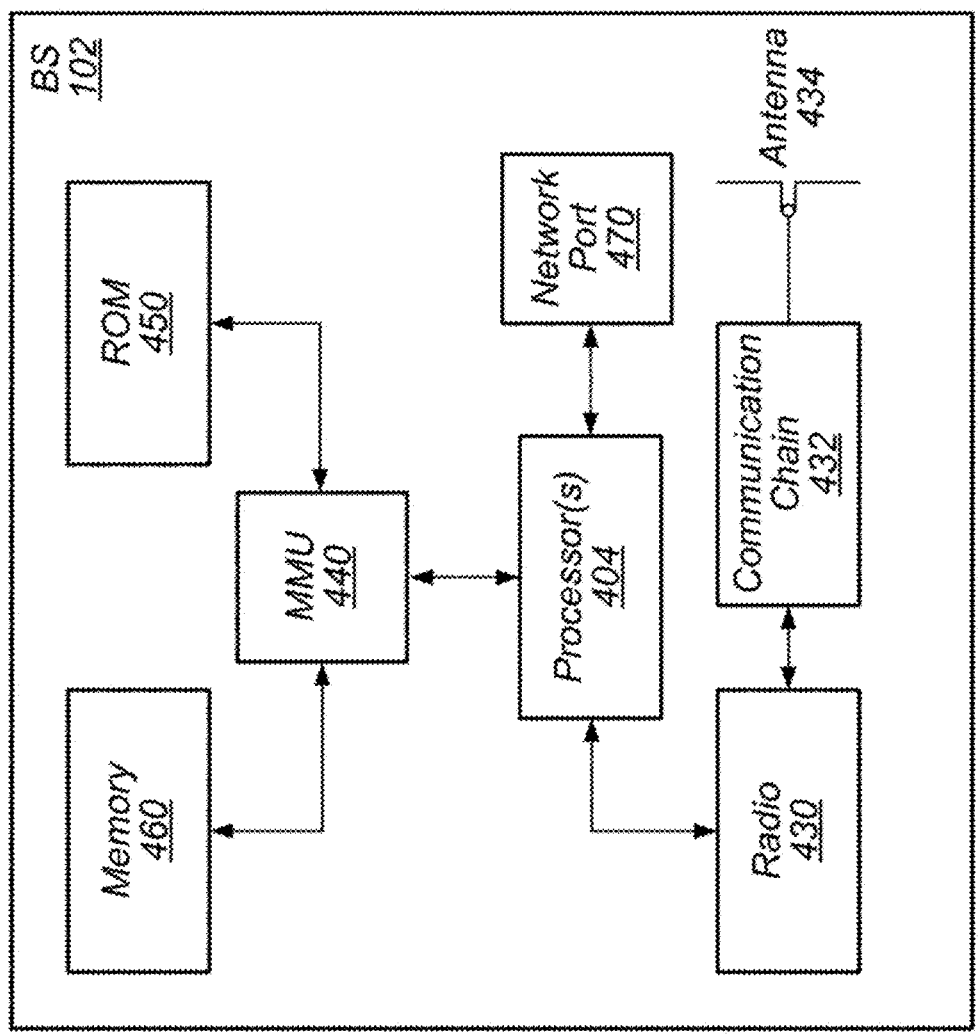
FIG. 4 illustrates an example block diagram of a BS according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively, (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
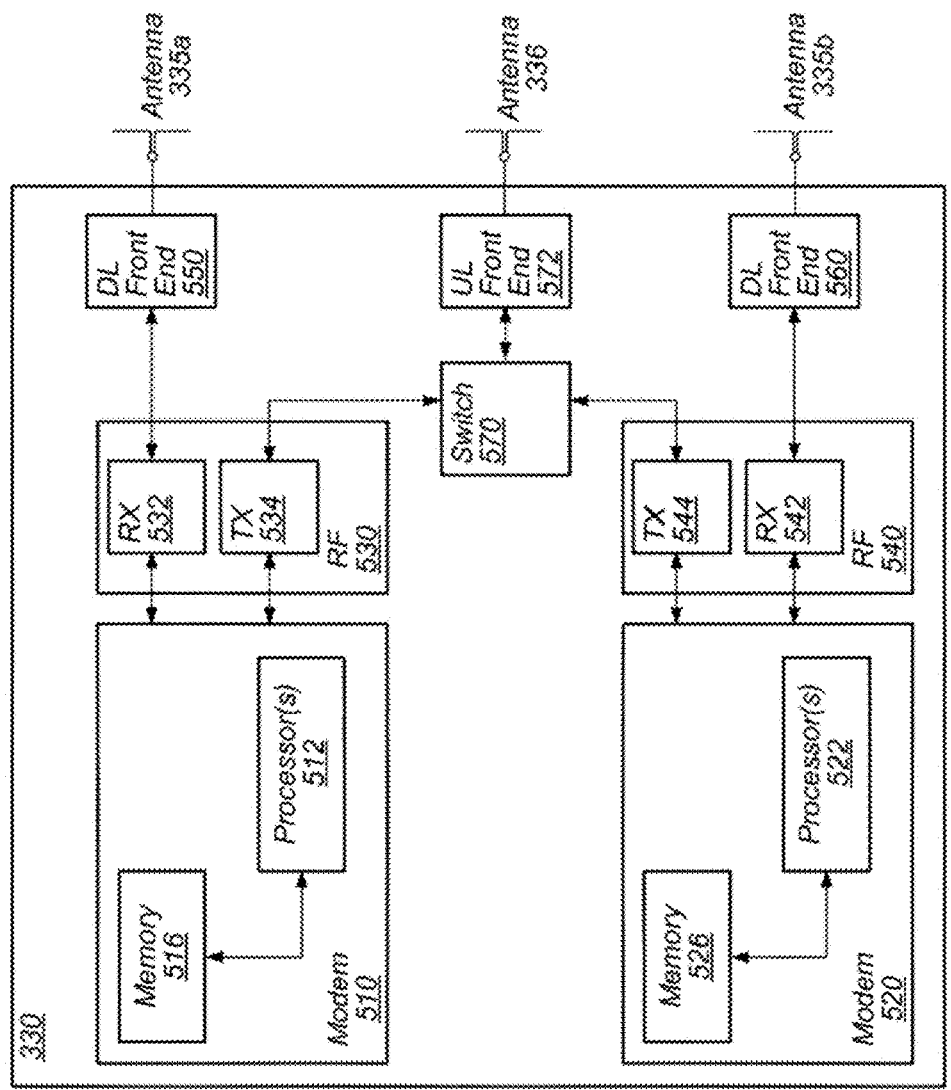
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
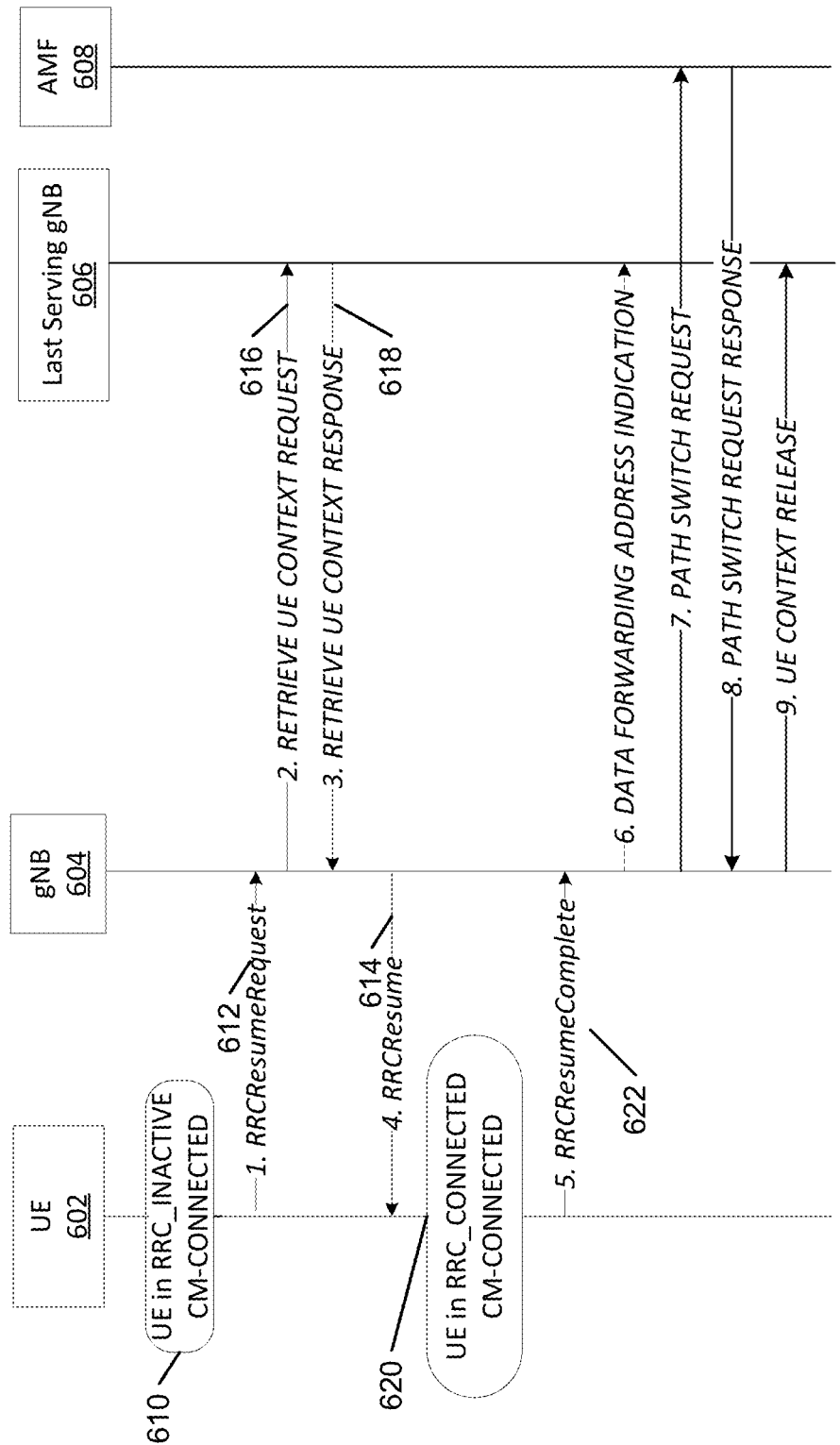
FIG. 6 is an illustration of UE triggered transition from RRC_INACTIVE state to RRC_CONNECTED state for a legacy procedure, according to some embodiments.

FIG. 6 illustrates a state transition from RRC_INACTIVE state 610 to RRC_CONNECTED state 620 triggered by the UE (e.g., 602) for a legacy procedure. RRC_INACTIVE state 610 hides the radio connection state from the core network to reduce the signaling overhead and tunnel establishments between the radio network and the core network. In smartphones, for example, background applications such as instant messengers continue to exchange data with the network to keep the connections alive on a frequent basis even when the screen of the smartphones is turned off.

The network (e.g., 604) can instruct the UE 602 to transition to the RRC_INACTIVE state 610 with an RRC Release message that includes a 'suspendConfig'. When the UE needs to transition from RRC_INACTIVE state 610 to RRC_CONNECTED state 620, the resumption of a suspended RRC connection can be initiated by upper layers or by RRC layer to perform an RNA update or by RAN paging from NG-RAN. The RRC connection resume procedure reactivates AS security and re-establishes SRB(s) and DRB (s).

The procedure to transition from RRC_INACTIVE state 610 to RRC_CONNECTED state 620 is triggered by the UE either in response to a paging, when the UE 602 has uplink data, for example. While the UE 602 is in RRC_INACTIVE state, the UE triggers an RRC connection re-activation procedure by sending RRCResumeRequest to the network (e.g., base station or gNB 604). During the RRC_INACTIVE state, the UE 602 remains CM-CONNECTED. Upon receiving RRCResumeRequest 612, the network 604 retrieves the UE Context Request 616 based on the UE Context ID, performs the necessary mobility actions, and responds with UE Context Response 618. Upon the reception of the RRCResume 614, the UE 602 confirms successful completion of an RRC connection resumption procedure by sending RRCResumeComplete (DCCH) message 622 on SRB1 using AM mode.

FIG. 7B shows an enhancement of the embodiments 700 described in the present disclosure in contrast to a legacy procedure (e.g., FIG. 7A) for an initial data transmission 708 when the UE 702 is in RRC_INACTIVE 706 state. In contrast to the legacy procedure (e.g., FIG. 7A), embodiments 700 described in the present disclosure can be used for the initial transmission 708 when the UE 702 is in RRC_INACTIVE state 706 without transitioning to the RRC_CONNECTED state, thereby reducing the data transmission latency and the amount of signaling overhead that occurs during state transitions. The described embodiments 700 allow data (e.g., small data) transmission in RRC_INACTIVE state 706 without a state transition to RRC_CONNECTED state. In this manner, the UE 702 energy efficiency can be enhanced when small data is transmitted in RRC_INACTIVE state 706.

Figure 8A:
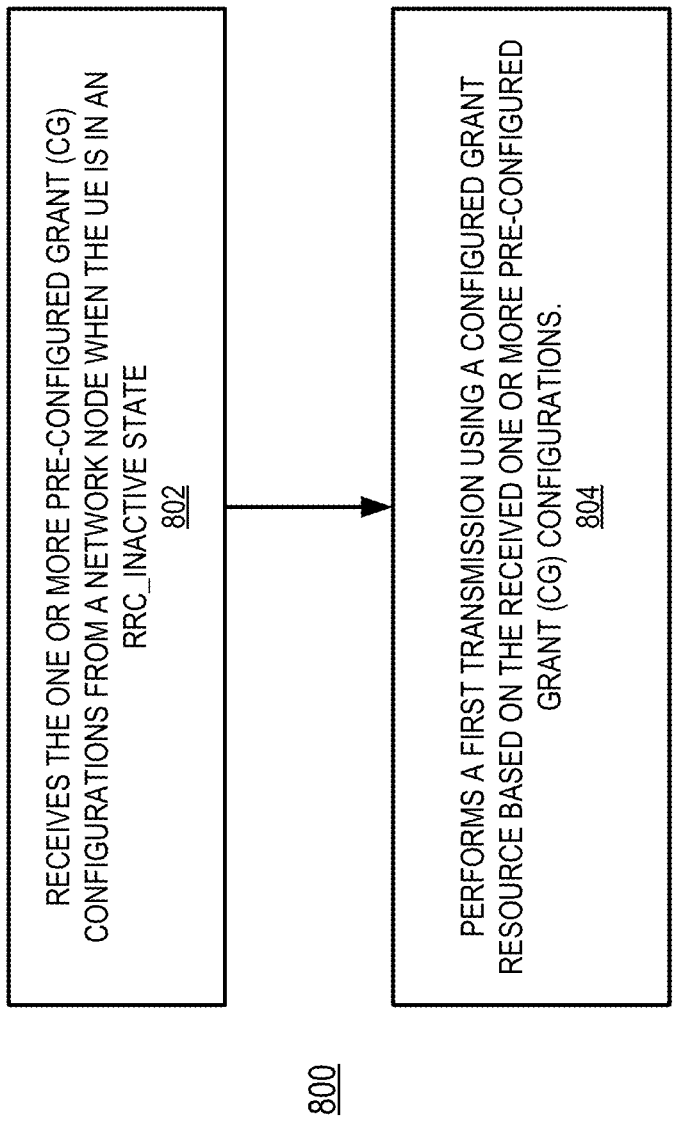
FIG. 8A is an illustration of some embodiments of small data procedure at a UE, according to some embodiments.

FIG. 8A illustrates a flow chart 800 according to some embodiments. In some embodiments, at block 802 the UE receives the one or more pre-configured grant (pre-CG) configurations for an RRC_INACTIVE state from a network node. The one or more pre-CG configurations enable initial data transmission when the UE is in the RRC_INACTIVE state without transitioning to the CONNECTED state. After the UE receives the one or more pre-CG configurations, at block 804 the UE performs, while the UE is in the RRC_INACTIVE state, the initial data transmission using a pre-CG resource based on the received one or more pre-CG configurations.

Figure 8B:
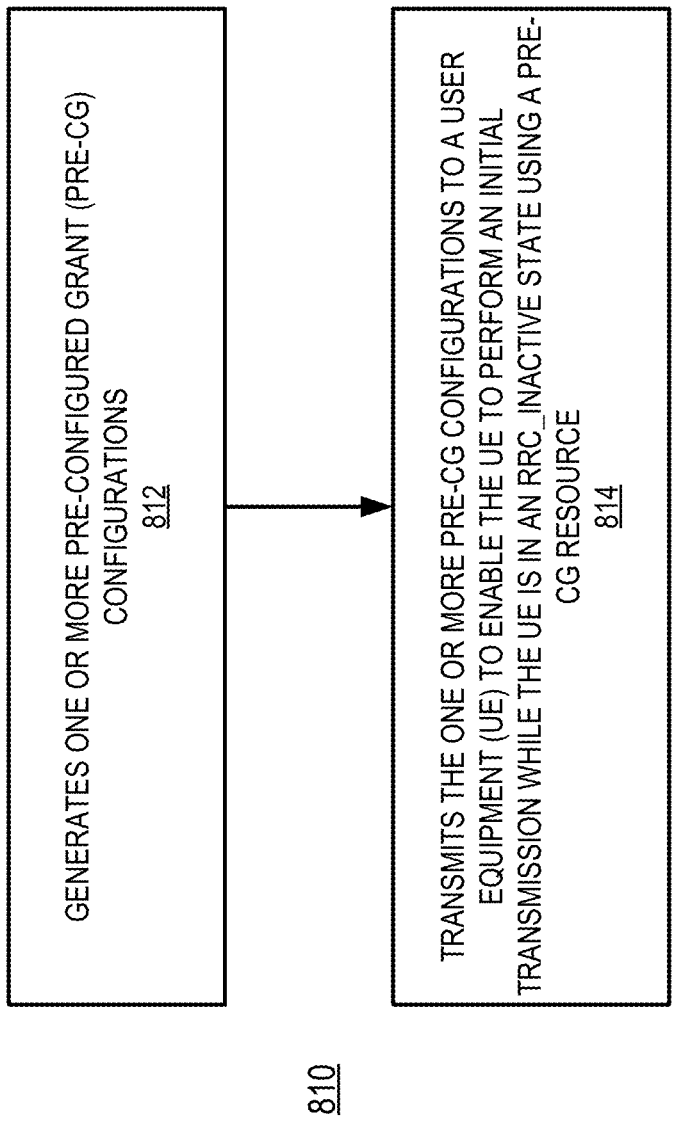
FIG. 8B is an illustration of some embodiments of small data procedure at a base station, according to some embodiments.

FIG. 8B illustrates a flow chart 810 according to some embodiments. In some embodiments, at block 802, the base station generates one or more pre-configured grant (pre-CG) configurations. The base station also transmits the one or more pre-CG configurations to a user equipment (UE) to enable the UE to perform an initial transmission while the UE is in an RRC_INACTIVE state using a pre-CG resource based on the transmitted one or more pre-CG configurations.

Figure 8C:
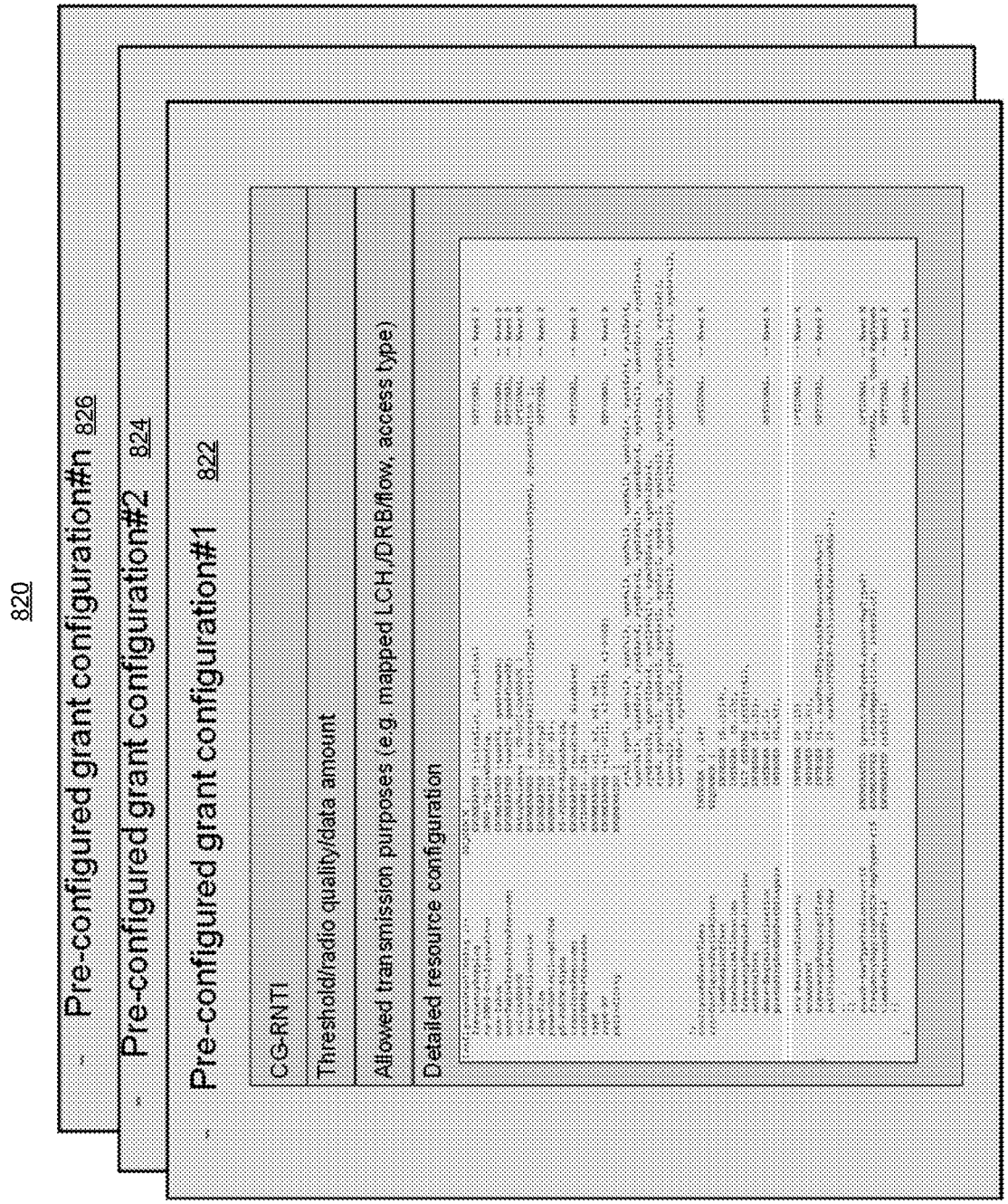
FIG. 8C is an illustration of some embodiments of one or more pre-configured grant configurations, according to some embodiments.

FIG. 8C illustrates some embodiments of one or more pre-configured grant configurations 820, according to some embodiments. As illustrated in FIG. 8C, in some embodiments, for example, base station (e.g., 704) can provide multiple pre-CG configurations 820 (e.g., pre-CG configurations #1 822, pre-CG configurations #2 824, . . . , pre-CG configurations #n 826). Different pre-CG configurations can serve different purposes including different access types (e.g., paging triggered, UE triggered, signaling triggered), different transmission priority (priority can be derived based on the LCH priority), different mapped LCH/DRB/QoS flow, and valid TA. Optionally, the base station can configure the applicable cell list for each pre-CG configuration.

In some embodiments, the one or more pre-CG configurations 810 include a configuration of the pre-CG resource and one or more conditions to use the pre-CG resource. In some embodiments, the one or more conditions to use the pre-CG resource include one or more of an access type, a transmission priority, a mapped Logical Channel (LCH)/Dedicated Radio Bearer (DRB)/Quality of Service (QoS) flow, and a valid timing advance (TA). The one or more conditions to use the pre-CG resource also include radio quality, allowed access type, and data amount.

The one or more pre-CG configurations for the initial data transmission can be provided according to various embodiments. In some embodiments, pre-configuration for the initial transmission can be provided via a dedicated signaling and broadcast signaling.

Figure 9A:
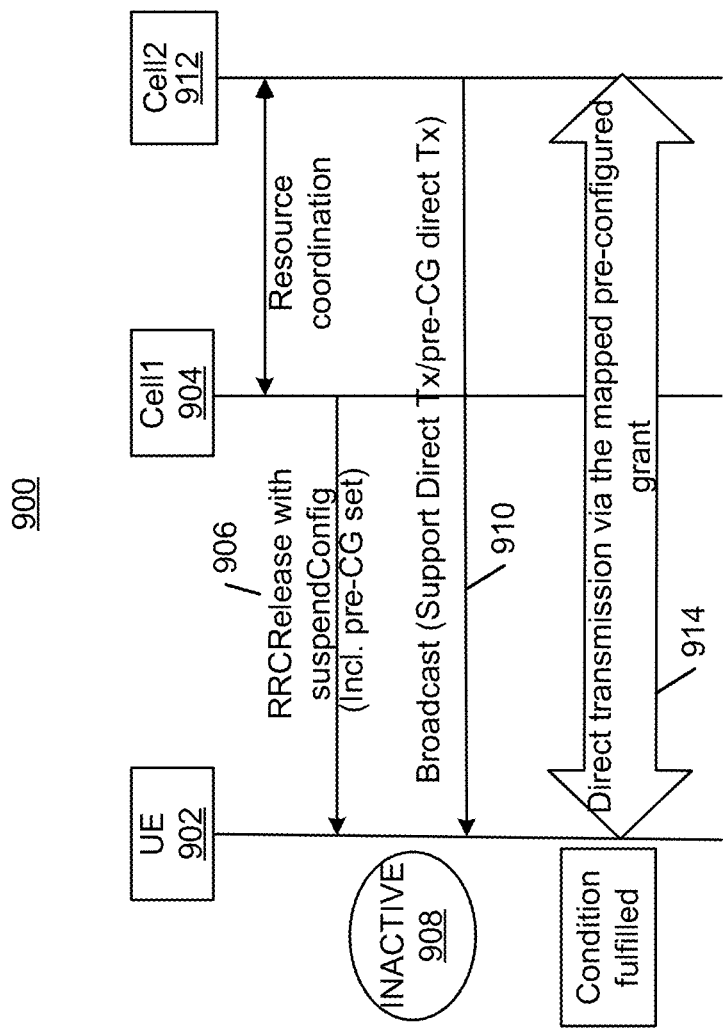
FIGS. 9A-9C are communication flows of some embodiments of signaling between the UE and the base station to enable initial data transmission using pre-CG configuration, according to some embodiments.

FIG. 9A illustrates an exemplary embodiment of a communication flow 900 between a UE (e.g., 902) and a base station (e.g., 904). In these embodiments, the communication flow 900 includes a UE 902 and a base station 904 in which the UE 902 can perform an initial data transmission using a pre-CG resource while the UE is in INACTIVE state.

In these embodiments, the base station 904 transmits a dedicated RRC message including the one or more pre-CG configurations for the RRC_INACTIVE state. The base station also configures the UE to enter RRC_INACTIVE state.

In some embodiments, the base station 904 transmits a broadcast message including an indication if a cell sending the broadcast message supports the initial data transmission using the pre-CG resource.

In these embodiments, the UE 902 receives a dedicated RRC message 906 including pre-CG configuration for the RRC_INACTIVE state from the base station (e.g., Cell 1 904). The RRC message 906 can also include RRCRelease message with suspendConfig to transition the UE from the CONNECTED state to the INACTIVE state. In this manner, the one or more pre-CG configurations for the RRC_INACTIVE state can be provided by the base station via dedicated signaling. The UE can store the received pre-CG configurations. After the UE receives the RRC message and the pre-CG configurations, the UE enters the RRC_INACTIVE state 908. Then, the UE receives a broadcast message 910 including an indication if a cell sending the broadcast message supports the initial data transmission using the pre-CG resource. If the cell 912 sending the broadcast message supports the initial data transmission using the pre-CG resource, the UE 902 triggers the initial data transmission 914 using the configured grant (pre-CG) resource to the cell based on the received one or more pre-CG configurations based on the indication in the broadcast message. Note that the initial data transmission is a small data transmission when the UE is in INACTIVE state. In contrast to the legacy procedure, pre-CG configurations received by the UE can be used for the initial transmission using the pre-CG resource when the UE is in RRC_INACTIVE state without transitioning to the RRC_CONNECTED state, thereby reducing the data transmission latency and the amount of signaling overhead that occurs during state transitions. In this manner, the UE energy efficiency can be enhanced when data (e.g., small data) is transmitted in RRC_INACTIVE state.

Figure 9B:
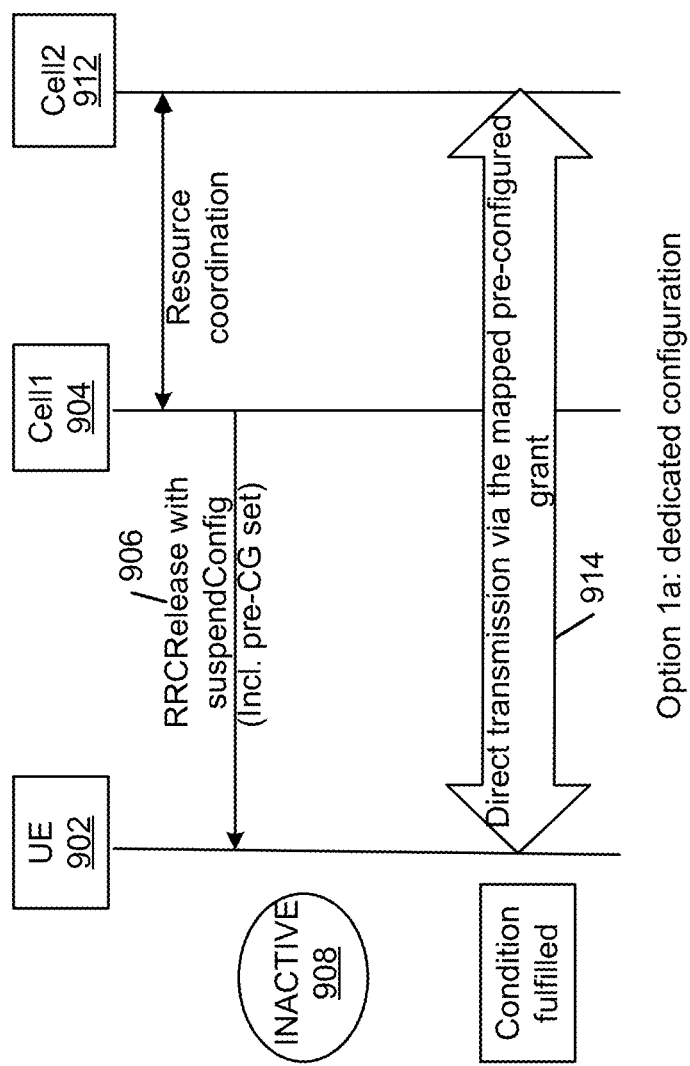

FIG. 9B illustrates an exemplary embodiment of a communication flow 900 between a UE (e.g., 902) and a base station (e.g., 904). In some embodiments, the base station 904 transmits a dedicated RRC message including the one or more pre-CG configurations for the RRC_INACTIVE state and a list of cells for which the one or more pre-CG configurations are valid. The base station 904 also configures configuring the UE to enter the RRC_INACTIVE state.

In some other embodiments, the base station 904 configures the UE to enter the RRC_INACTIVE state. The base station also transmits a System Information Block (SIB) including the one or more pre-CG configurations for the RRC_INACTIVE state. Additionally, the base station receives the initial data transmission using the pre-CG resource.

In some other embodiments, the UE 902 receives a dedicated RRC message 906 from the base station. The RRC message 906 includes the pre-CG configurations for the RRC_INACTIVE state and a list of cells for which the one or more pre-CG configurations are valid. After UE 902 receives the dedicated RRC message 906, the UE 902 enters the RRC_INACTIVE state 908. Then, the UE determines whether a current camping cell is included in the list of cells for which the one or more pre-CG configurations are valid. If the current camping cell is included in the list of cells for which the one or more pre-CG configurations are valid, the UE triggers the initial data transmission 904 using the pre-CG resource to the current camping cell based on the determination.

Figure 9C:
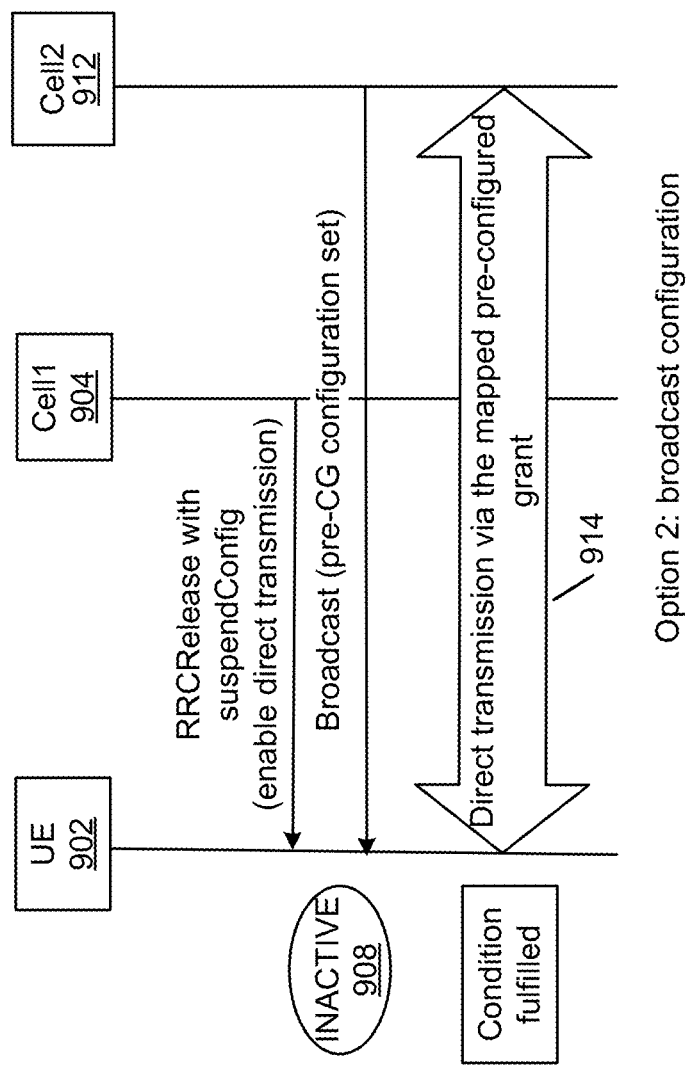

FIG. 9C illustrates an exemplary embodiment of a communication flow 900 between a UE (e.g., 902) and a base station (e.g., 904). In some other embodiments, the UE enters the RRC_INACTIVE state 908. The UE receives a System Information Block (SIB) including the pre-CG configurations for the RRC_INACTIVE state from a current camping cell 912. The UE 902 triggers the initial data transmission 914 using the configured grant (CG) resource.

Figure 10:
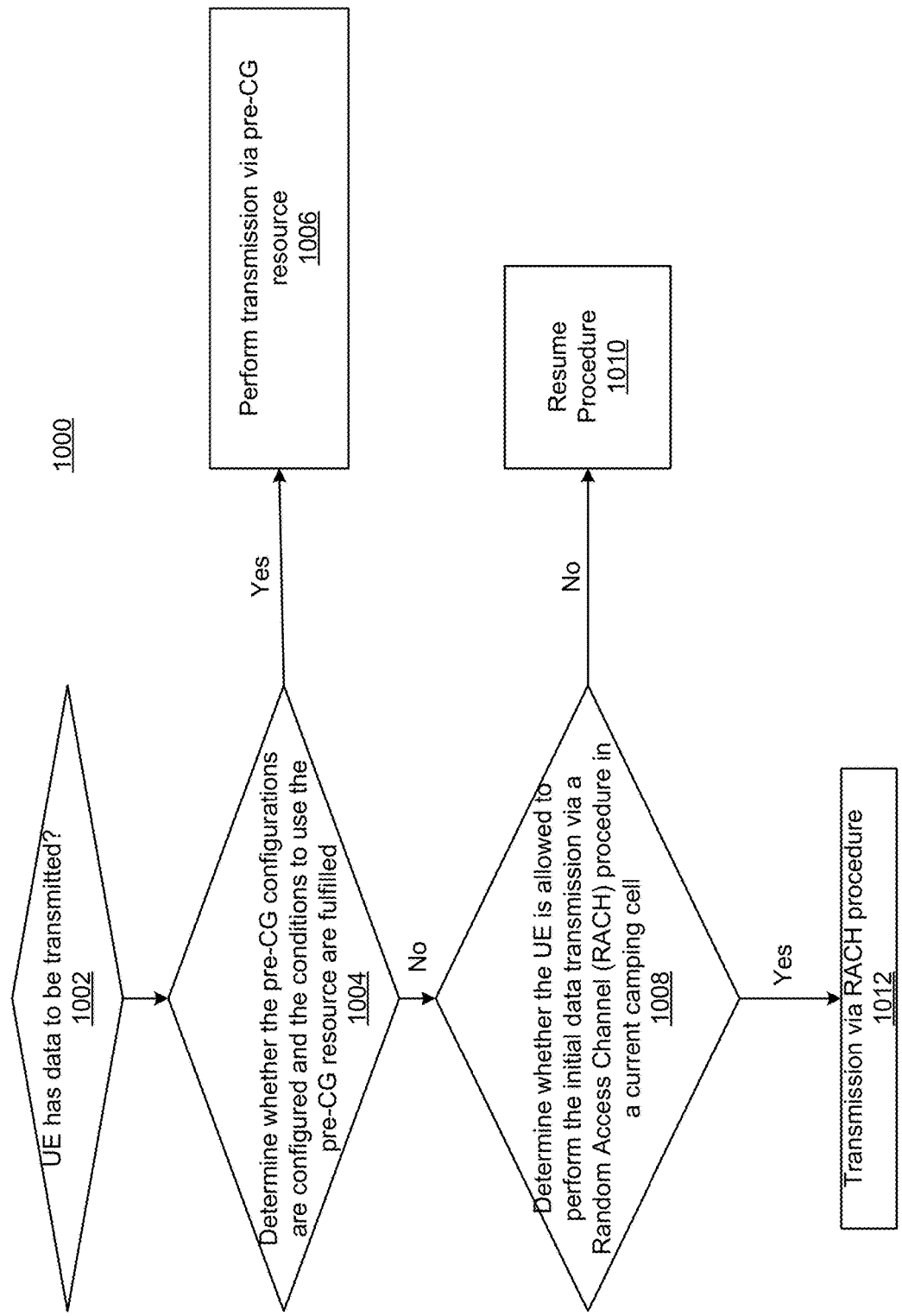
FIG. 10 is a flow diagram illustrating an UE operation to initiate the initial transmission via pre-CG configuration, according to some embodiments.

FIG. 10 depicts a flow chart illustrating a UE operation 1000 to initiate the initial transmission via pre-CG configuration, according to some embodiments. In block 1002, the UE determines whether the UE has data to be transmitted when the UE is in the RRC_INACTIVE state. In block 1004, the UE determines whether the one or more pre-CG configurations are configured and the one or more conditions to use the pre-CG resource are fulfilled. If the one or more conditions to use the pre-CG resource are fulfilled, the UE performs the initial data transmission using the received one or more pre-CG configurations at block 1006. In contrast to the legacy procedure, pre-CG configurations received by the UE can be used for the initial transmission using the pre-CG resource when the UE is in INACTIVE state without transitioning to the CONNECTED state, thereby reducing the data transmission latency and the amount of signaling overhead that occurs during state transitions. In this manner, the UE energy efficiency can be enhanced when data (e.g., small data) is transmitted in RRC_INACTIVE state.

If the one or more conditions to use the pre-CG resource are not fulfilled, the UE determines whether the UE is allowed to perform the initial data transmission via a Random Access Channel (RACH) procedure in a current camping cell at block 1008. If the UE is allowed to perform the initial data transmission via the RACH procedure, the UE performs the initial data transmission via the RACH procedure at block 1012. If the UE is not allowed to perform the initial data transmission via the RACH procedure, the UE performs the first transmission via a RRC connection Resume Procedure at block 1010.

Figure 11:
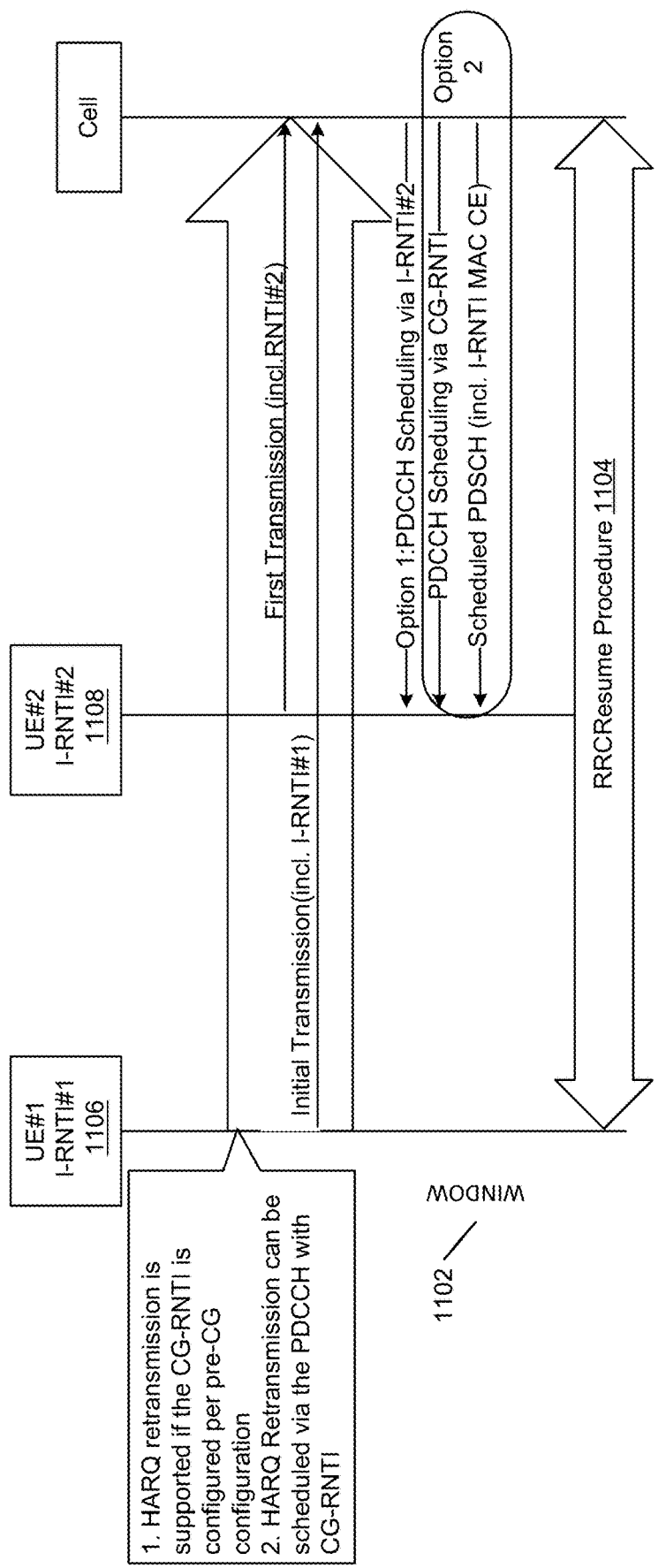
FIG. 11 is an illustration of some embodiments of a contention resolution mechanism for the initial transmission via pre-CG configuration, according to some embodiments.

FIG. 11 illustrates a communication flow between UE and a base station according to some embodiments. In some embodiments, the UE includes a UE identifier (ID) in a MAC Protocol Data Units (PDU) for the initial data transmission. The UE monitors a network feedback within a predefined time window 1102 after the initial data transmission using the pre-CG resource. The UE determines whether the initial data transmission is successful. In these embodiments, the UE ID is an Inactive RNTI (I-RNTI) (e.g., 1106 and 1108).

In some embodiments, the base station receives a UE identifier (ID) in a MAC Protocol Data Units (PDU) for the initial data transmission. The base station transmits a network feedback within a predefined time window after the initial data transmission using the pre-CG resource.

In some embodiments, a CG configuration of the one or more pre-CG configurations includes a CG-RNTI, the transmitted network feedback includes a downlink MAC PDU including the UE ID, which is scheduled using the CG-RNTI of the CG configuration used for the initial data transmission.

In some other embodiments, if the UE receives the network scheduling via the UE's I-RNTI, within the pre-defined time window, the UE can regard the contention resolution successful and the initial transmission is successful.

In some embodiments, the determination of the successful initial data transmission is based on receiving the network feedback including an Inactive RNTI (I-RNTI) of the UE.

In some embodiments, a pre-CG configuration of the one or more pre-CG configurations includes a CG-RNTI, and determination of the successful initial data transmission is based on receiving the network feedback including a downlink MAC PDU including the UE ID, which is scheduled using the CG-RNTI of the CG configuration used for the initial data transmission.

In some embodiments, the UE determines the initial data transmission is unsuccessful when the UE does not receive the network feedback within the predefined time window 1102. Accordingly, the UE can trigger the legacy resume procedure 1104.

In legacy procedure, the uplink data transmission does not provide feedback to the UE and, therefore, the UE cannot determine whether the data transmission is successful or not.

After performing data transmission using pre-CG resource, the UE monitors network feedback within a predefined window. In some embodiments, if the UE receives the network scheduling via the UE's I-RNTI within the predefined window, the UE can regard the contention resolution is successful and the initial data transmission is successful.

In some other embodiments, if the UE receives network downlink scheduling via the CG-RNTI (configured according to the pre-CG configuration), and the UE ID is included in the scheduled downlink MAC PDU, the UE can regard the initial data transmission is successful. In some other embodiments, if the UE receives layer 1 ACK feedback, the UE can assume the initial data transmission successful.

In some other embodiments, if the UE cannot receive its feedback in the window, the UE can regard the transmission is not successful and the UE can trigger the legacy resume procedure.

In some embodiments, the base station transmits a network feedback within a predefined time window after the initial data transmission using the pre-CG resource. The network feedback includes a layer 1 acknowledgement (ACK) feedback, a downlink control information (DCI) for uplink (UL) grant or downlink (DL) assignment with a corresponding CG-RNTI, or a DCI for UL grant assignment with a UE I-RNTI.

Figure 12:
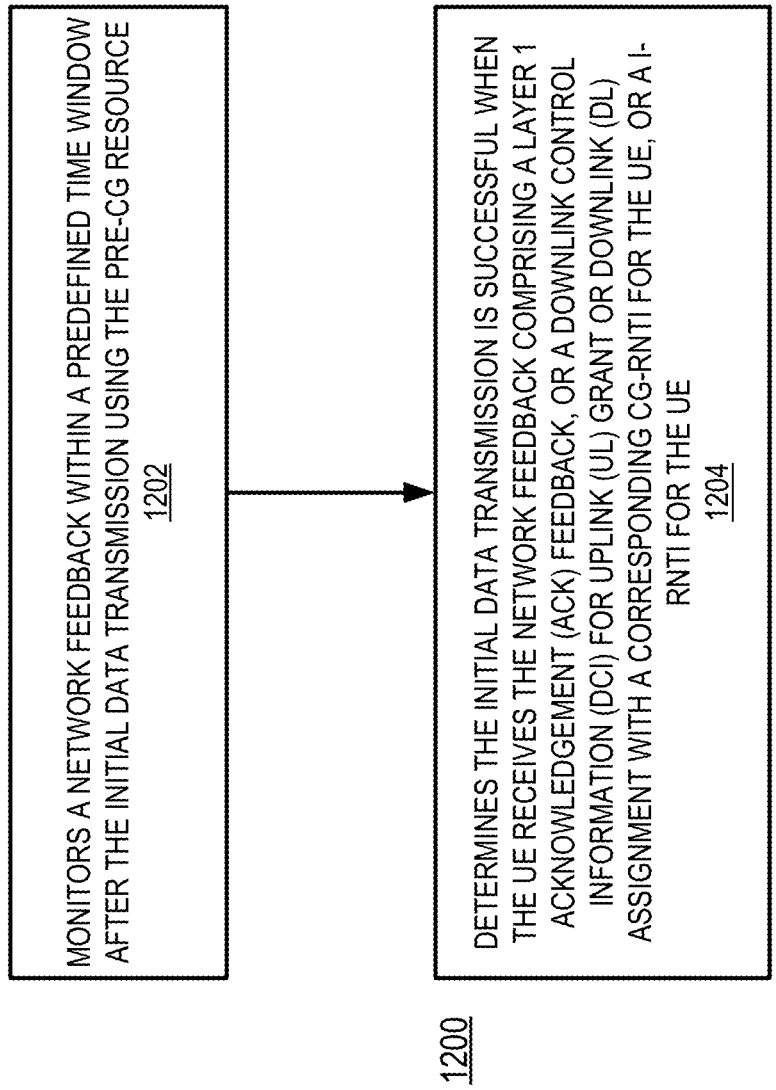
FIGS. 12-13 are flow diagrams of some embodiments of a process for the pre-configured uplink (UL) grant for the initial transmission at the UE in INACTIVE state, according to some embodiments.

FIG. 12 illustrates a flow chart 1200 according to some embodiments. In some embodiments, at block 1202, the UE monitors a network feedback within a predefined time window after the initial data transmission using the pre-CG resource. At block 1204, the UE determines the initial data transmission is successful when the UE receives the network feedback including a layer 1 acknowledgement (ACK) feedback, a downlink control information (DCI) for uplink (UL) grant or downlink (DL) assignment with a corresponding CG-RNTI, or a DCI for UL grant assignment with a UE I-RNTI.

Data transmission using pre-CG resource can be based on a valid TA for an uplink data transmission. The valid TA can be based on a previous TA value or TA value equals to zero.

Figure 13:
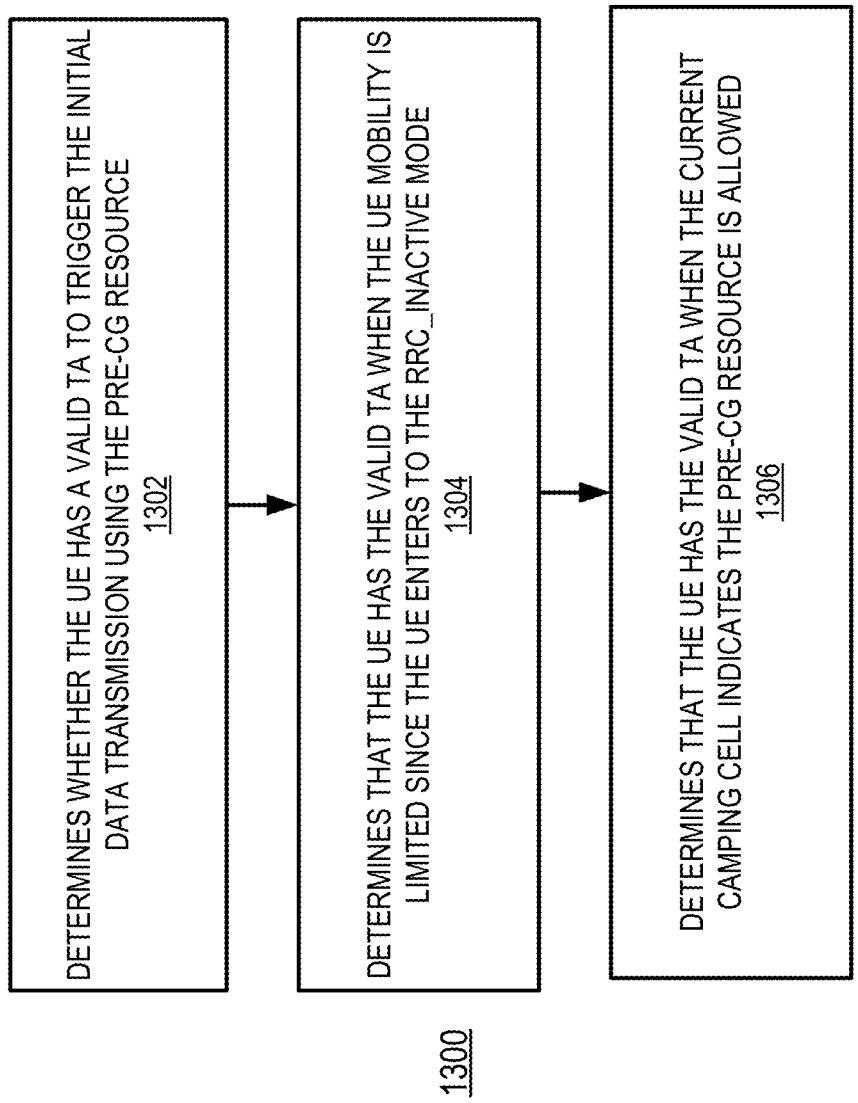

FIG. 13 illustrates a flow chart 1300 according to some embodiments. In some embodiments, at block 1302, the UE determines whether the UE has a valid TA to trigger the initial data transmission using the pre-CG resource. In these embodiments, at block 1304, the UE determines that the UE has the valid TA when the UE mobility is limited since the UE enters the RRC_INACTIVE mode. The valid TA can be a TA used in a previous RRC_CONNECTED state. At block 1306, the UE determines that the UE has the valid TA when the current camping cell indicates the pre-CG resource is allowed. The value of the valid TA equals to zero.

In some embodiments, the UE stays within the same cell and triggers the direct transmission. In these embodiments, if the UE is static, the UE can use the previously stored TA (which is used in a previous CONNECTED state) to perform the pre-CG transmission.

If the UE is moving within the cell, in some embodiments, the UE can calculate the TA based on downlink timing change, and use the updated TA to perform the initial data transmission using the pre-CG resource. In some other embodiments, the UE can trigger legacy resume procedure or trigger data transmission via RACH procedure if the UE does not have a valid TA. In some embodiments, the UE does not have a valid TA when the timer set in the CONNECTED state has expired.

In some embodiments, if the UE moves to a new cell and that cell indicates data transmission using the pre-CG resource is allowed, the UE can use TA value equal to zero to initiate the initial transmission using the pre-CG resource.

In some other embodiments, the processes or methods depicted in the preceding figures may be performed by a baseband processor.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A user equipment (UE) device comprising: an antenna; a memory;
radio frequency (RF) circuitry commutatively coupled to the antenna; and a processor configured to perform operations comprising:
receiving a dedicated radio resource control RRC message comprising one or more pre-configured grant (pre-CG) configurations for an RRC inactive (RRC_INACTIVE) state from a network node, wherein the one or more pre-CG configurations are for an initial data transmission when the UE is in the RRC_INACTIVE state;
entering the RRC_INACTIVE state;
receiving a broadcast message comprising an indication if a cell sending the broadcast message supports the initial data transmission using a pre-CG resource;
triggering the initial data transmission using the pre-CG resource to the cell based on the received one or more pre-CG configurations based on the indication in the broadcast message; and
performing, while the UE is in the RRC_INACTIVE state, the initial data transmission using a pre-CG resource based on the received one or more pre-CG configurations.

2. The UE device of claim 1, wherein each of the one or more pre-CG configurations comprises a configuration of the pre-CG resource and one or more conditions to use the pre-CG resource.

3. A baseband (BB) processor of a user equipment (UE) in a wireless communication system configured to perform operations comprising:
receiving a dedicated radio resource control RRC message comprising one or more pre-configured grant (pre-CG) configurations for an RRC inactive (RRC_INACTIVE) state from a network node, wherein the one or more pre-CG configurations are for an initial data transmission when the UE is in the RRC_INACTIVE state;
entering the RRC_INACTIVE state;
receiving a broadcast message comprising an indication if a cell sending the broadcast message supports the initial data transmission using a pre-CG resource;
triggering the initial data transmission using the pre-CG resource to the cell based on the received one or more pre-CG configurations based on the indication in the broadcast message; and
performing, while the UE is in the RRC_INACTIVE state, the initial data transmission using a pre-CG resource based on the received one or more pre-CG configurations.

4. The BB processor of claim 3, wherein each of the one or more pre-CG configurations comprises a configuration of the pre-CG resource and one or more conditions to use the pre-CG resource.

5. The BB processor of claim 4, wherein the one or more conditions to use the pre-CG resource comprise one or more of an access type, a transmission priority, a mapped Logical Channel (LCH)/Dedicated Radio Bearer (DRB)/Quality of Service (QOS) flow, and a valid timing advance (TA).

6. The BB processor of claim 3, wherein the dedicated RRC message comprises a list of cells for which the one or more pre-CG configurations are valid, and the operations further comprise:
   determining whether a current camping cell is included in the list of cells for which the one or more pre-CG configurations are valid; and
   triggering the initial data transmission using the pre-CG resource to the current camping cell based on the determination.

7. The BB processor of claim 3, wherein the operations further comprise
   receiving a System Information Block (SIB) comprising the one or more pre-CG configurations for the RRC_INACTIVE state from a current camping cell.

8. The BB processor of claim 3, wherein each of the one or more pre-CG configurations comprises a configuration of the pre-CG resource and one or more conditions to use the pre-CG resource, and the operations further comprise:
   determining whether the UE has data to be transmitted when the UE is in the RRC_INACTIVE state;
   determining whether the one or more pre-CG configurations are configured and the one or more conditions to use the pre-CG resource are fulfilled;
   if the one or more conditions to use the pre-CG resource are fulfilled, performing the initial data transmission using the one or more pre-CG configurations;
   if the one or more conditions to use the pre-CG resource are not fulfilled, determining whether the UE is allowed to perform the initial data transmission via a Random Access Channel (RACH) procedure in a current camping cell;
   if the UE is allowed to perform the initial data transmission via the RACH procedure, performing the initial data transmission via the RACH procedure; and
   if the UE is not allowed to perform the initial data transmission via the RACH procedure, performing a first transmission via an RRC connection Resume Procedure.

9. The BB processor of claim 3, wherein the operations further comprise:
   including a UE identifier (ID) in a medium access control (MAC) Protocol Data Units (PDU) for the initial data transmission;
   monitoring a network feedback within a predefined time window after the initial data transmission using the pre-CG resource; and
   determining whether the initial data transmission is successful.

10. The BB processor of claim 9, wherein the UE ID is an radio network temporary identifier (RNTI).

11. The BB processor of claim 9, wherein determination of a successful initial data transmission is based on receiving the network feedback comprising a radio network temporary identifier (RNTI) of the UE.

12. The BB processor of claim 9, wherein a configured grant (CG) configuration of the one or more pre-CG configurations comprises a radio network temporary identifier (RNTI), and determination of the successful initial data transmission is based on receiving the network feedback comprising a downlink MAC PDU including the UE ID, which is scheduled using the RNTI of the CG configuration used for the initial data transmission.

13. The BB processor of claim 9, wherein the operations further comprise: comprising:
   determining the initial data transmission is unsuccessful when the UE does not receive the network feedback within the predefined time window.

14. The BB processor of claim 3, wherein the operations further comprise:
   monitoring a network feedback within a predefined time window after the initial data transmission using the pre-CG resource; and
   determining the initial data transmission is successful when the UE receives the network feedback comprising a layer 1 acknowledgement (ACK) feedback, or a downlink control information (DCI) for uplink (UL) grant or downlink (DL) assignment with a corresponding radio network temporary identifier (RNTI) for the UE.

15. The BB processor of claim 3, wherein the operations further comprise:
   determining whether the UE has a valid timing advance (TA) to trigger the initial data transmission using the pre-CG resource, comprising:
   determining that the UE has the valid TA when a UE mobility is limited since the UE enters the RRC_INACTIVE state, wherein the valid TA is a TA used in a previous RRC_CONNECTED state; and
   determining that the UE has the valid TA when the current camping cell indicates the pre-CG resource is allowed, wherein a value of the valid TA equals to zero.

16. The BB processor of claim 3, wherein each of the one or more pre-CG configurations comprises a configuration of the pre-CG resource and one or more conditions to use the pre-CG resource, and the operations further comprise:
   determining whether the UE has data to be transmitted when the UE is in the RRC_INACTIVE state;
   determining whether the one or more pre-CG configurations are configured and the one or more conditions to use the pre-CG resource are fulfilled;
   if the one or more conditions to use the pre-CG resource are fulfilled, performing the initial data transmission using the one or more pre-CG configurations;
   if the one or more conditions to use the pre-CG resource are not fulfilled, determining whether the UE is allowed to perform the initial data transmission via a Random Access Channel (RACH) procedure in a current camping cell;
   if the UE is allowed to perform the initial data transmission via the RACH procedure, performing the initial data transmission via the RACH procedure; and
   if the UE is not allowed to perform the initial data transmission via the RACH procedure, performing a first transmission via an RRC connection Resume Procedure.

17. The BB processor of claim 3, wherein the operations further comprise:
   determining whether the UE has a valid timing advance (TA) to trigger the initial data transmission using the pre-CG resource, comprising:
   determining that the UE has the valid TA when a UE mobility is limited since the UE enters the RRC_INACTIVE state, wherein the valid TA is a TA used in a previous RRC connected (RRC_CONNECTED) state; and
   determining that the UE has the valid TA when the current camping cell indicates the pre-CG resource is allowed, wherein a value of the valid TA equals to zero.

18. A method comprising:
   receiving a dedicated radio resource control RRC message comprising one or more pre-configured grant (pre-CG) configurations for an RRC inactive (RRC_INACTIVE) state from a network node, wherein the one or more pre-CG configurations are for an initial data transmission when a UE is in the RRC_INACTIVE state;

entering the RRC_INACTIVE state;

receiving a broadcast message comprising an indication if a cell sending the broadcast message supports the initial data transmission using a pre-CG resource;

triggering the initial data transmission using the pre-CG resource to the cell based on the received one or more pre-CG configurations based on the indication in the broadcast message; and performing, while the UE is in the RRC_INACTIVE state, the initial data transmission using a pre-CG resource based on the received one or more pre-CG configurations.

19. The method of claim 18, wherein each of the one or more pre-CG configurations comprises a configuration of the pre-CG resource and one or more conditions to use the pre-CG resource.

20. The method of claim 18, wherein a list of cells for which the one or more pre-CG configurations are valid, and the method further comprises:

the dedicated RRC message comprises determining whether a current camping cell is included in the list of cells for which the one or more pre-CG configurations are valid; and triggering the initial data transmission using the pre-CG resource to the current camping cell based on the determination.

21. The method of claim 18, wherein each of the one or more pre-CG configurations comprises a configuration of the pre-CG resource and one or more conditions to use the pre-CG resource, and the method further comprising:

determining whether the UE has data to be transmitted when the UE is in the RRC_INACTIVE state;

determining whether the one or more pre-CG configurations are configured and the one or more conditions to use the pre-CG resource are fulfilled;

if the one or more conditions to use the pre-CG resource are fulfilled, performing the initial data transmission using the one or more pre-CG configurations;

if the one or more conditions to use the pre-CG resource are not fulfilled, determining whether the UE is allowed to perform the initial data transmission via a Random Access Channel (RACH) procedure in a current camping cell;

if the UE is allowed to perform the initial data transmission via the RACH procedure, performing the initial data transmission via the RACH procedure; and if the UE is not allowed to perform the initial data transmission via the RACH procedure, performing a first transmission via an RRC connection Resume Procedure.

* * * * *